United States Patent [19]

Zilka

[11] Patent Number: 5,511,226
[45] Date of Patent: Apr. 23, 1996

[54] SYSTEM FOR GENERATING SNOOP ADDRESSES AND CONDITIONALLY GENERATING SOURCE ADDRESSES WHENEVER THERE IS NO SNOOP HIT, THE SOURCE ADDRESSES LAGGING BEHIND THE CORRESPONDING SNOOP ADDRESSES

[75] Inventor: Anthony M. Zilka, Portland, Oreg.

[73] Assignee: Intel Corporation, Santa Clara, Calif.

[21] Appl. No.: 935,035

[22] Filed: Aug. 25, 1992

[51] Int. Cl.⁶ .......................... G06F 12/00; G06F 12/06; G06F 12/10

[52] U.S. Cl. .......................... 395/823; 395/410; 395/841; 395/872; 395/200.08; 364/228.1; 364/243.41; 364/964.25

[58] Field of Search .................... 395/275, 425, 395/375, 200.08, 823, 872, 841, 410, 401; 364/200

[56] References Cited

U.S. PATENT DOCUMENTS

| 4,264,953 | 4/1981 | Douglas et al. | 364/200 |
| 4,442,487 | 4/1984 | Fletcher et al. | 364/200 |
| 5,136,700 | 8/1992 | Thacker | 395/400 |
| 5,197,146 | 3/1993 | LaFretra | 395/425 |
| 5,226,144 | 7/1993 | Moriwaki et al. | 395/425 |
| 5,228,136 | 7/1993 | Shimizu et al. | 395/425 |
| 5,255,211 | 10/1993 | Redmond | 364/578 |
| 5,261,074 | 11/1993 | Solomon et al. | 395/425 |
| 5,289,588 | 2/1994 | Song et al. | 395/425 |
| 5,303,362 | 4/1994 | Butts, Jr. et al. | 395/425 |

OTHER PUBLICATIONS

"TOP-1:A Snoop-Cache-Based Multiprocessor", Oba et al, IEEE (1990) pp. 101-108.

Primary Examiner—Thomas C. Lee
Assistant Examiner—Rehana Krick
Attorney, Agent, or Firm—Blakely, Sokoloff, Taylor & Zafman

[57] ABSTRACT

A processor and a memory address bus, a processor and a memory data bus, and a data transfer control unit are provided to a multiprocessor computer system comprising a first and a second processor, a first and a second corresponding private cache, a pipelined memory shared among the processors, an I/O device, and a cache coherency mechanism for maintaining cache coherency. I/O data stored in the shared memory are cacheable in the private caches. The processor and memory address and data buses are advantageously used to couple these elements and to control data transfers in and out of the shared memory. All data transfers in and out of the shared memory are made in multiples of the basis on which cache coherency is maintained, and through the data transfer control unit. As a result, minimum complimentary cache coherency actions, in addition to those provided by the cache coherency mechanism, are required of the data transfer control unit and the caches, to allow data to be transferred between the shared memory and the I/O device. Furthermore, successive cache coherency basis transfers between the shared memory and the I/O device are overlapped, thereby improving the overall performance of the multiprocessor computer system.

26 Claims, 5 Drawing Sheets

SYSTEM FOR GENERATING SNOOP ADDRESSES AND CONDITIONALLY GENERATING SOURCE ADDRESSES WHENEVER THERE IS NO SNOOP HIT, THE SOURCE ADDRESSES LAGGING BEHIND THE CORRESPONDING SNOOP ADDRESSES

BACKGROUND OF THE INVENTION

1. Field of the Invention

The present invention relates to the field of computer systems. More particularly, the present invention relates to methods employed by the computer systems to input/output data.

2. Art Background

Traditionally, data transfers between memory and an input-output (I/O) device of a computer system are accomplished in one of three ways:

1. Programmed I/O. In this case, all data transfers between the memory and the I/O device are completely controlled by the central processing unit (CPU), or more precisely, by a program executed by the CPU.

2. Interrupt I/O. In this case, all data transfers between the memory and the I/O device are initiated by the I/O devices through interrupts. In response, the CPU suspends whatever it is currently doing and attends to the needs of the I/O device.

3. Direct Memory Access (DMA). In this case, all data transfers between the memory and the I/O device are accomplished without involving the CPU.

The DMA approach provides a much faster way of moving data between the memory and the I/O device. Typically, a direct memory access controller is employed. Upon request of the I/O device, the DMA controller suppresses the CPU, takes control of the system bus and causes data to be transferred between the memory and the I/O device. The source/destination memory locations and the amount of data transferred are controlled by the starting address and word count provided to the DMA controller.

Most DMA controllers are not involved in the actual transfer of the data. Data are transferred directly between the memory and the I/O device under the control of the DMA controller. The DMA controller, the CPU, the memory and the I/O device are all coupled to a system bus. Alternatively, some DMA controllers are involved in the actual transfer of data. After taking control of the system bus, the DMA controller causes data to be transferred from the memory (or the I/O device) to itself and then re-transmits the data to the I/O device (or the memory). In that case, the I/O device is coupled to the DMA controller instead of the system bus. By involving the DMA controller in the actual data transfer, the DMA controller gains the ability to interpret or process the data being transferred. However, the DMA controller pays for the added ability by sacrificing performance. For either type of DMA controllers, by duplicating the internal logic of the DMA controller, a DMA controller may support multiple I/O devices.

The memory typically operates at a substantially slower speed than CPU. In order to avoid having the CPU idle too often while waiting for data or instructions from the memory, a cache which can operate at a higher speed than the memory is often used to buffer the data and the instructions between the memory and the CPU. At any particular point in time, a subset of the instructions and data stored in memory is stored in the cache. Thus, if data are allowed to be transferred into memory directly from an I/O device under the control of a DMA controller, data stored in cache may be outdated. Therefore, the CPU must be protected from getting stale data from cache.

A simple and the most common solution to the problem is to limit direct data transfer between memory and I/O devices to a designated area of memory only, commonly referred as the I/O address space. The data in the I/O address space are not cached, thereby eliminating the possibility of the CPU getting staled data from the cache. The CPU reads/writes I/O data directly from/to the I/O address space using special I/O instructions supported by the CPU. Alternatively, a cache coherency mechanism must be provided to ensure the cached data are current. However, cache coherency mechanisms are expensive and they are often not cost effective for uniprocessor computer systems.

A similar problem exists on multiprocessor computer systems where each processor has its own private cache and shares a common memory. Since the current copy of data in a processor's private cache may be outdated by modification made by another processor, the processors must be protected from getting stale data from its private cache. However, the simple solution of not caching shared data among the processors is not an acceptable solution, since it would substantially undermine the performance gained by having multiple processors in the system. A cache coherency mechanism, although costly, is nevertheless provided to ensure the data in all the private caches are concurrent. Typically, it involves snooping operations to be performed on the private caches to check if copies of the altered data are being maintained in the other private caches. Detected copies are invalidated. Thus, it is desirable if the cache coherency mechanism provided on these multiprocessor computer systems can be exploited to continue to allow data to be transferred directly between memory and I/0 devices and at the same time be cacheable.

As will be disclosed, these objects and desired results are among the objects and desired results achieved by the present invention that provide a method and apparatus for transferring cacheable I/O data between a memory and an I/O device and maintaining cache coherency.

SUMMARY OF THE INVENTION

A method and apparatus for transferring cacheable I/O data between a memory and an I/O device and maintaining cache coherency is disclosed. The method and apparatus of the present invention has particular application to transferring data in and out of a computer system, particularly multiprocessor computer systems with cache coherency mechanisms. Under the present invention, a processor and a memory address bus, a processor and a memory data bus, and a data transfer control unit are provided to a multiprocessor computer system comprising a first and a second processor, a first and a second corresponding private cache, a pipelined memory shared among the processors, an I/O device, and a cache coherency mechanism for maintaining cache coherency. I/O data stored in the shared memory are cacheable in the private caches. The processor and memory address and data buses are advantageously used to couple these elements and to control data transfers in and out of the shared memory. All data transfers in and out of the shared memory are made in multiples of the basis on which cache coherency is maintained, and through the data transfer control unit.

As a result, minimum complimentary cache coherency actions, in addition to those provided by the cache coherency mechanism, are required of the data transfer control unit and the caches, to allow data to be transferred between the shared memory and the I/O device. These additional cache coherency actions include the data transfer control unit snooping the private caches for every cache coherency basis transferred, the snoop hit cache draining the snoop hit cache coherency basis for a read by the I/O device if the private caches are write back caches, and the snoop hit caches invalidating their data in the snoop hit cache coherency bases for a write by the I/O device. Furthermore, successive cache coherency basis transfers between the shared memory and the I/O device are overlapped, thereby improving the overall performance of the multiprocessor computer system. The data transfer control unit snoops the private caches for the next cache coherency basis transfer while the current cache coherency basis is being transferred.

In one embodiment, the cache coherency mechanism maintains cache coherency on a line basis. Thus, in this embodiment, all data transfers in and out of the shared memory are in multiples of lines. The data transfer control unit is a line transfer control unit. The additional cache coherency actions include the line transfer control unit snooping the private caches for every line transferred, the snoop hit cache draining the snoop hit cache line for a read by the I/O device if the private caches are write back caches, and the snoop hit caches invalidating their data in the snoop hit cache line for a write by the I/O device. Furthermore, successive line transfers between the shared memory and the I/O device are overlapped. The line transfer control unit snoops the private caches for the next line transfer while the current line is being transferred.

BRIEF DESCRIPTION OF THE DRAWINGS

The objects, features and advantages of the present invention will be apparent from the following detailed description of the preferred and alternate embodiments of the invention with references to the drawings in which.

DETAILED DESCRIPTION PRESENTLY PREFERRED AND ALTERNATE EMBODIMENTS

A method and apparatus for transferring cacheable I/O data between a memory and an I/O device and maintaining cache coherency is disclosed. The method and apparatus of the present invention has particular application to transferring data in and out of a computer system, particularly multiprocessor computer systems with cache coherency mechanisms. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
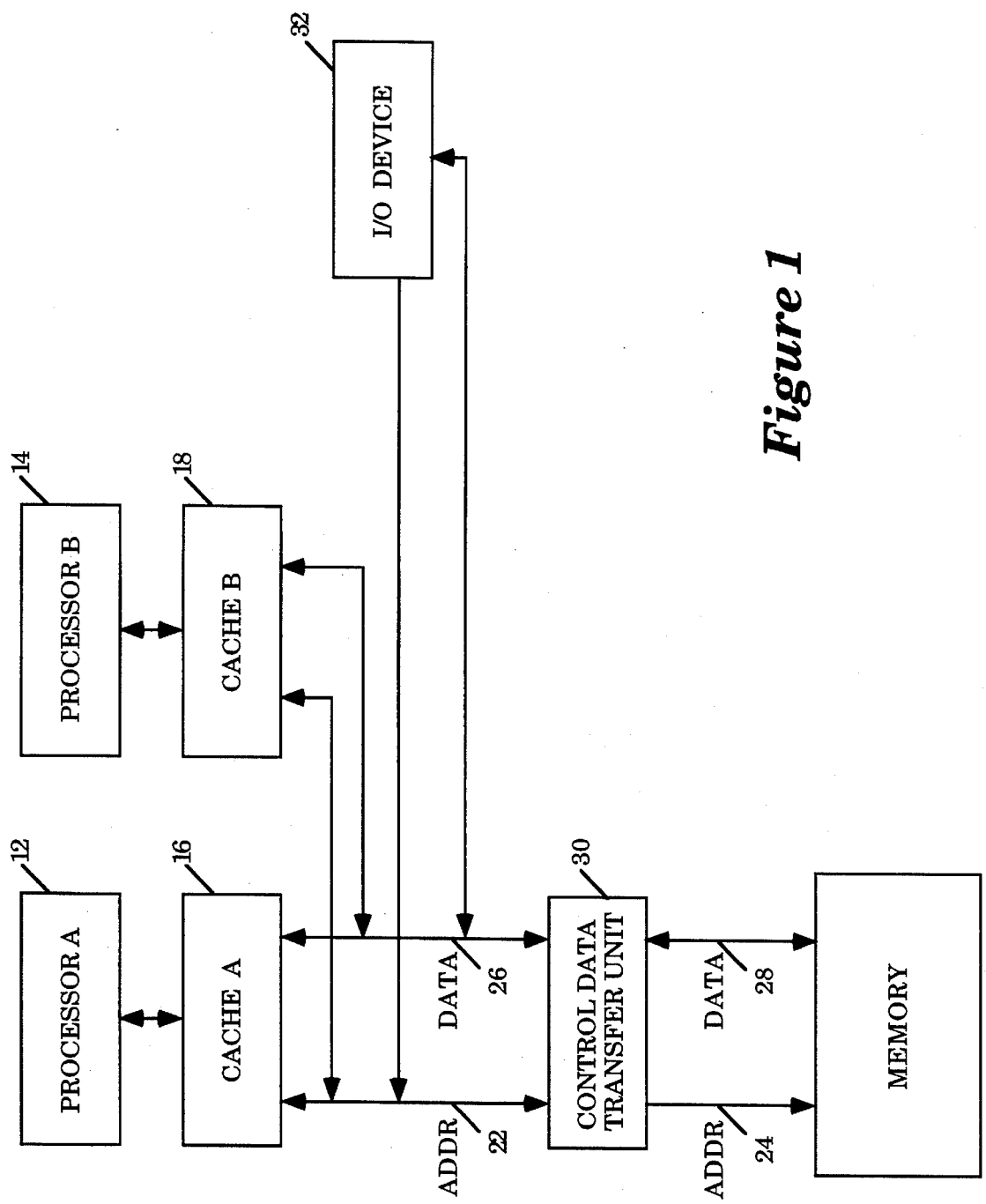
FIG. 1 shows a functional block diagram illustrating a multiprocessor computer system that incorporates the teachings of the present invention.

Referring now to FIG. 1, a functional block diagram illustrating an exemplary multiprocessor computer system incorporating the teachings of the present invention is shown. Shown is an exemplary multiprocessor computer system 10 comprising a processor A 12 and a processor B 14. Each processor 12 or 14 has its own private cache, A or B, 16 or 18, and shares a pipelined memory 20. The private caches, A and B, 16 and 18 are advantageously coupled to the processor address bus 22, and the processor data bus 26, and the shared memory 20 is advantageously coupled to the memory address bus 24, and the memory data bus 28. The processor address and data buses, 22 and 26, and the memory address and data buses, 24 and 28, are in turn advantageously coupled to the data transfer control unit 30 of the present invention.

The exemplary multiprocessor computer system 10 further comprises a cache coherency mechanism (not shown) for maintaining cache coherency between the private caches, 16 and 18, and the shared memory 20. For the purpose of describing the present invention, cache coherency is assumed to be maintained at a cache line level, and the data transfer control unit 30 is a line transfer control unit. Thus, all data transfers between the private caches 16, and 18, and the shared memory 20, are of the size of a cache line.

Also shown is an I/O device 32 advantageously coupled to the processor address and data buses, 22 and 26. The I/O data stored in the shared memory 20 are cacheable in the private caches, 16 and 18, i.e. copies of the I/O data may exist in the private caches, 16 and 18. Under the present invention, data transferred directly between the memory 20 and the I/O device 32, are transferred in multiples of the cache coherency basis, i.e. in multiples of lines.

Together, these elements cooperate to allow cacheable I/O data in multiples of line to be transferred directly between the shared memory 20 and the I/O device 32, and cache coherency maintained with minimal additional cache coherency actions. Furthermore, these elements cooperate to allow successive line transfers between the shared memory 20 and the I/O device 32 to be overlapped, thereby improving the overall performance of the exemplary multiprocessor computer system. Except for the manner in which the private caches, 16 and 18, the shared memory 20, the processor and memory address and data buses, 22–28, and the I/O device 32 cooperate with the line transfer control unit 30 for transferring cacheable I/O data between the memory 20 and the I/O device 32 and maintaining cache coherency, these elements as well as the processors, 12 and 14, are intended to represent broad categories of similar elements found in most computer systems. Their constitutions and basic functions are well known and will not be further described. The data transfer control unit 30 will be described in further detail with references to FIGS. 2–3, and the manner in which these elements cooperate with the data transfer control unit 30 will be described in further detail with references to FIGS. 4–5.

While for ease of understanding, the present invention is being described with cache coherency being maintained at the cache line level, based on the descriptions to follow, it will be appreciated that the present invention may be practiced with cache coherency being maintained on a basis other than the cache line. Additionally, while the present invention is being described with two processors, 12 and 14, based on the descriptions to follow, it will be appreciated that the present invention may be practiced with more or less processors. Furthermore, while the present invention is being described with one I/O device 32, based on the descriptions to follow, it will be appreciated that the present invention may be practiced with multiple I/O devices by duplicating the internal resources of the data transfer control unit 30.

Figure 2:
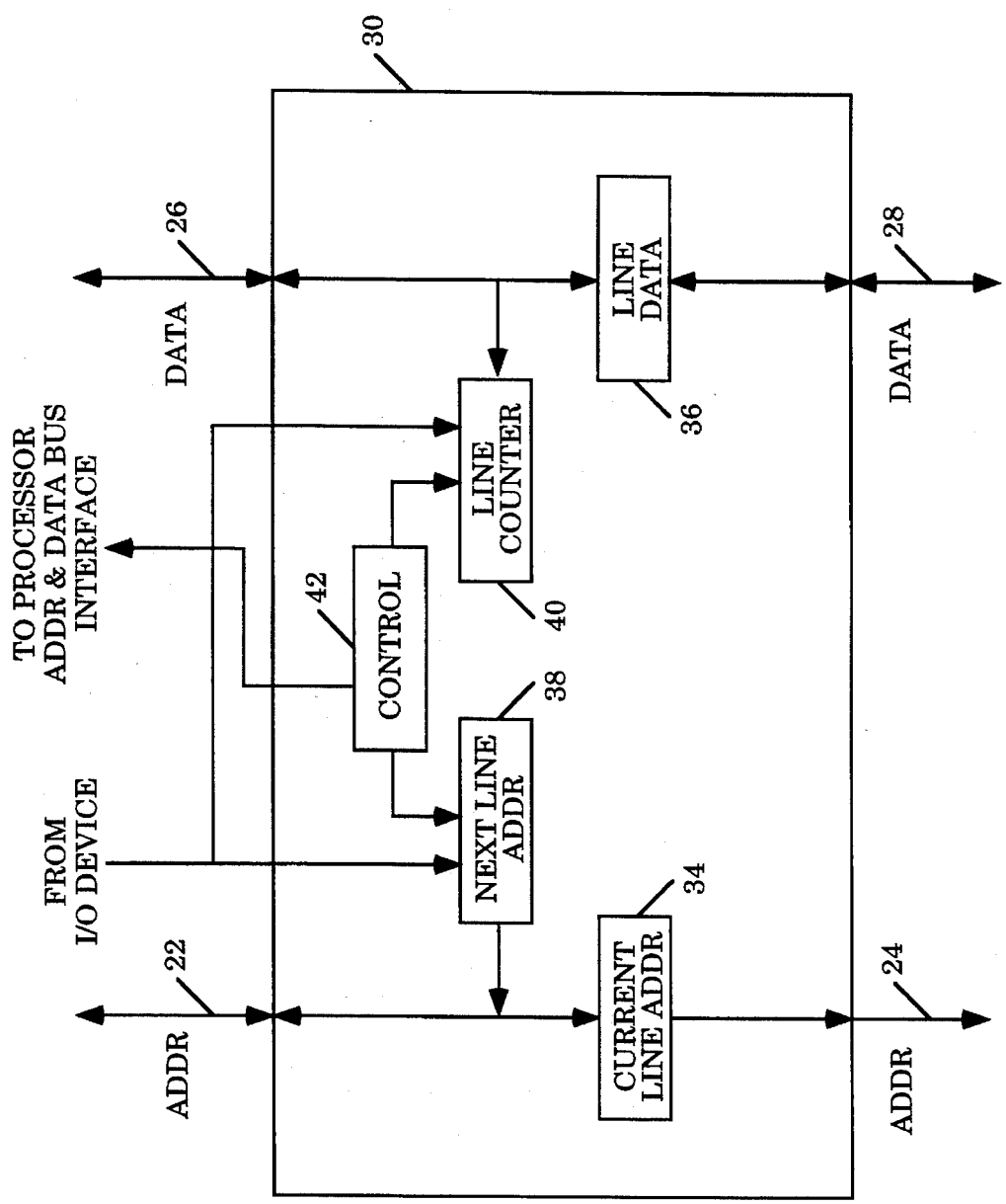
FIG. 2 shows a functional block diagram illustrating the line based embodiment of the data transfer control unit of the present invention.

Referring now to FIG. 2, a block diagram illustrating the line based embodiment of the data transfer control unit is shown. The line based embodiment of the data transfer control unit 30' comprises a current line address register 34, and a line data register 36, coupled to the processor and memory address buses, 22 and 24, and the processor and memory data buses, 26 and 28, respectively. Additionally, the line transfer control unit 30' comprises a next line address register 38, and a line counter 40, coupled to the current line address register 34 and the processor address bus 22, and the line data register 36 and the processor data bus 26, respectively. The next line address register 38 and the line counter 40 are also coupled to the I/O device. Furthermore, the line transfer control unit 30' comprises a control logic block 42 coupled to the next line address register 38 and the line counter 40. In one embodiment, the control logic block 42 is also coupled to the cache to processor address and data bus interfaces.

The current line address register 34 and the line data register 36 are used to store the address and the data of the current line being transferred in or out of the shared memory. The current line address register 34 latches the address of the current line being transferred either from the processor address bus 22 or from the next line address register 38, and drives the latched address onto the memory address bus 24. The line data register 28 latches the data of the current line being transferred from either the processor data bus 26 or the memory data bus 28, and drives the latched data onto the other data bus 28 or 26.

The next line address register 38 and the line counter 40 are used to store the address of the next line to be transferred, and the remaining number of lines to be transferred. The next line address register 38 receives the address of the next line to be transferred initially from the I/O device, i.e. the starting address of a series of line transfers. The stored address is incremented by the control logic block 42 after each line transfer unless the line count in the counter is zero. The stored address is selectively driven either onto the processor address bus 22 or into the current line address register 34. The line counter 40 receives the remaining number of lines to be transferred initially from the I/O device. The stored line count is decremented by the control logic block 42 after each line transfer.

As described earlier, the control logic block 42 is used to update the address and line count content in the next line address register 38 and the line counter 40 respectively. Additionally, for the embodiment where the control logic block 42 is also coupled to the processor address and data bus interfaces, the control logic block 42 is also used to disable these interfaces, which will be described in further detail below.

Figure 3:
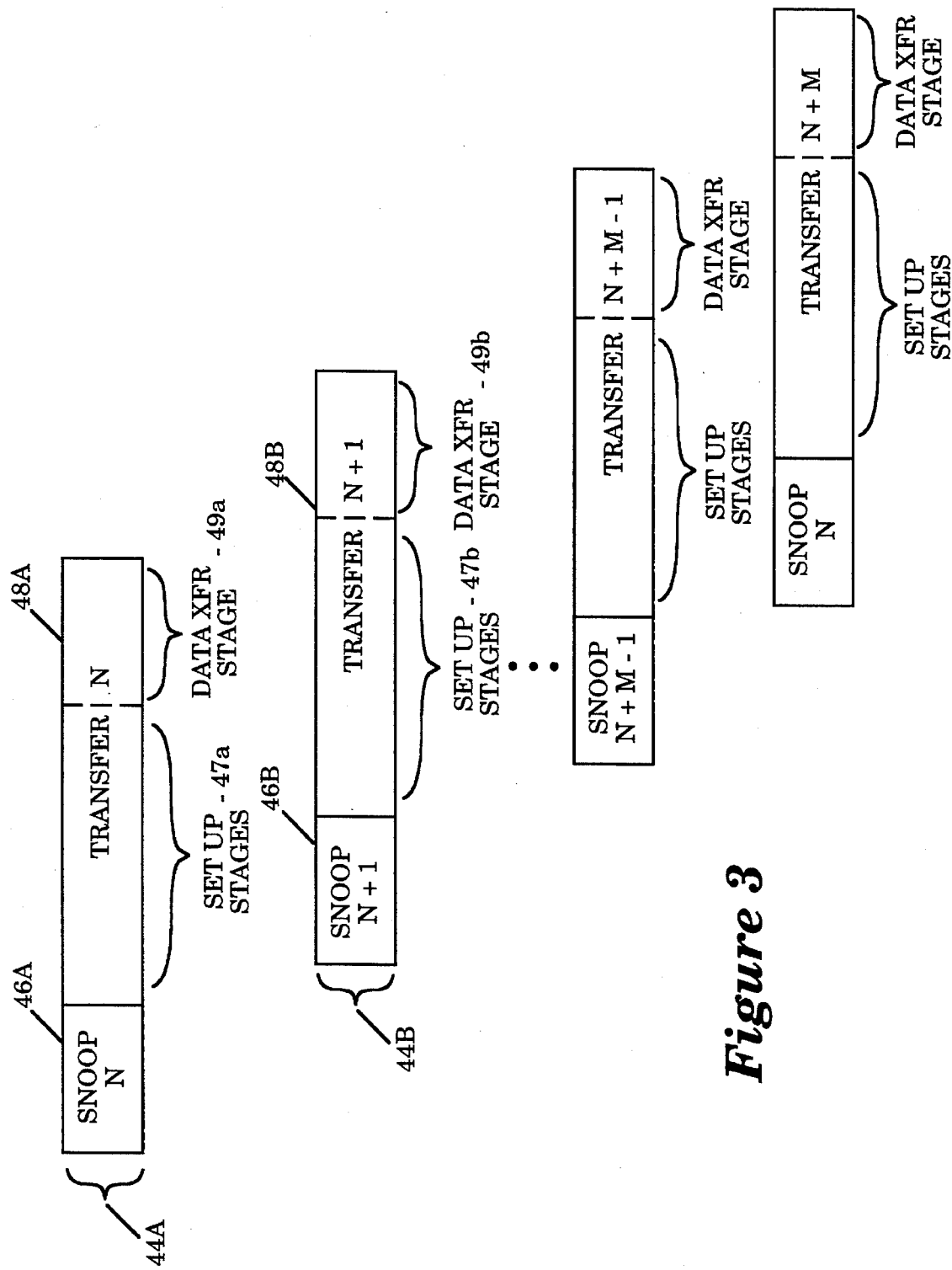
FIG. 3 illustrates the timing for successive cache coherency basis transfers.

Referring now to FIG. 3 a block diagram illustrating the timing of cache coherency basis transfer between the memory and the I/O device is shown. Shown are a number of timelines, e.g. 44a, 44b, for cache coherency basis transfer between the memory and the I/O device, each comprising a snooping time period, e.g. 46a or 46b, and a data transfer time period, e.g. 48a or 48b. The data transfer time period, e.g. 48a or 48b, can be further subdivided into a time period for set-up stages for accessing the pipelined memory, e.g. 47a or 47b, and a time period for a data transfer stage for actually transferring data in or out of the shared memory, e.g. 49a or 49b.

As a result of the manner in which the processor and memory address and data buses, and the data transfer control unit, are advantageously coupled to the private caches, the shared memory and the I/O device, and cooperate with each other, the timelines, e.g. 44a and 44b, for successive cache coherency basis transfers between the shared memory and the I/O device are overlapped. The caches are immediately snooped for the next cache coherency basis transfer, e.g. 46b, as soon as the caches are snooped for the current cache coherency basis transfer, e.g. 46a. Similarly, the data for the next cache coherency basis are actually transferred, e.g. 49b, as soon as the data for the current cache coherency basis are actually transferred, e.g. 49a. Since the number of clock cycles required for the actual data transfer, e.g. 49a or 49b, are relatively small, as compared to the number of clock cycles required for snooping the caches, e.g. 46a or 46b, and setting up for the actual data transfer, e.g. 47a or 47b, thus the ability to overlap the timelines of two successive cache coherency basis transfers, e.g. 44a and 44b, results in significant time savings.

Referring again to FIGS. 1–2, to transfer a line from the shared memory 20 to any one of the private caches, 16 or 18, a read address is driven by the private cache, 16 or 18, to the shared memory 20 onto the processor address, bus 22. The current line address register 34 of the line transfer control unit 30' latches the read address, and drives the read address onto the memory address bus 24. In response, the shared memory 30 drives the requested data onto the memory data bus 28. The line data register 36 of the line transfer control unit 30' latches the data, and drives the data onto the processor data bus 26. The private; cache 16 or 18 then latches the returning data from the processor data bus 26.

Similarly, to transfer a cache line from any one of the private caches, 16 or 18, to the shared memory 20, a write address and the data to be written are driven from the private cache, 16 or 18, onto the processor address and data buses respectively, 22 and 26. Again, the current line register 34 and the line data register 36 of the line control unit 30' latches the write address and the write data, and drives them onto file memory address and data buses, 24 and 28, respectively. The shared memory 20 then latches the write address and write data from the memory address and data buses, 24 and 28, and stores the write data into the write address.

Figure 4:
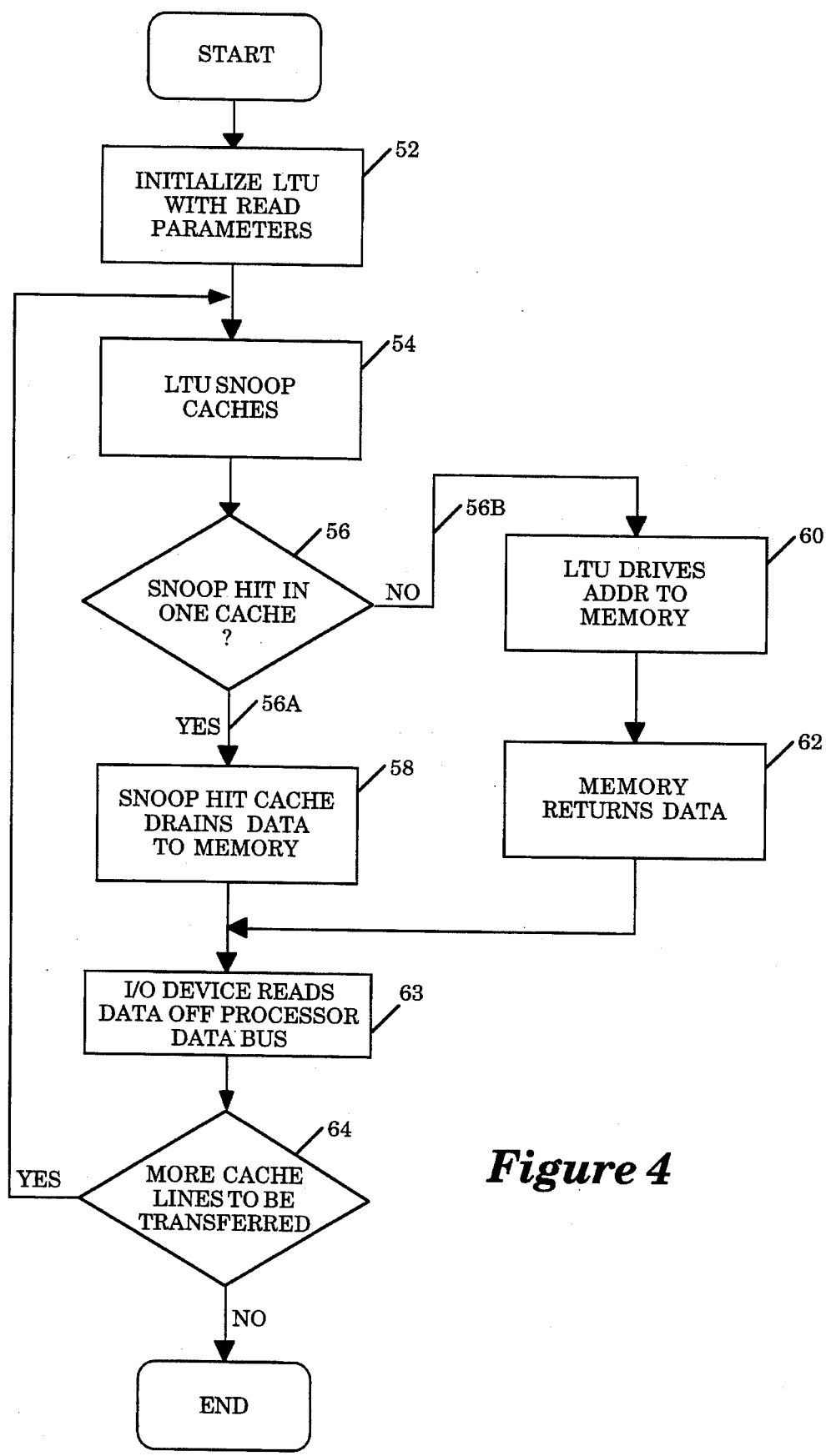
FIG. 4 shows a flow diagram for the method of the present invention for transferring cacheable I/O data from a memory to an I/O device.
Figure 5:
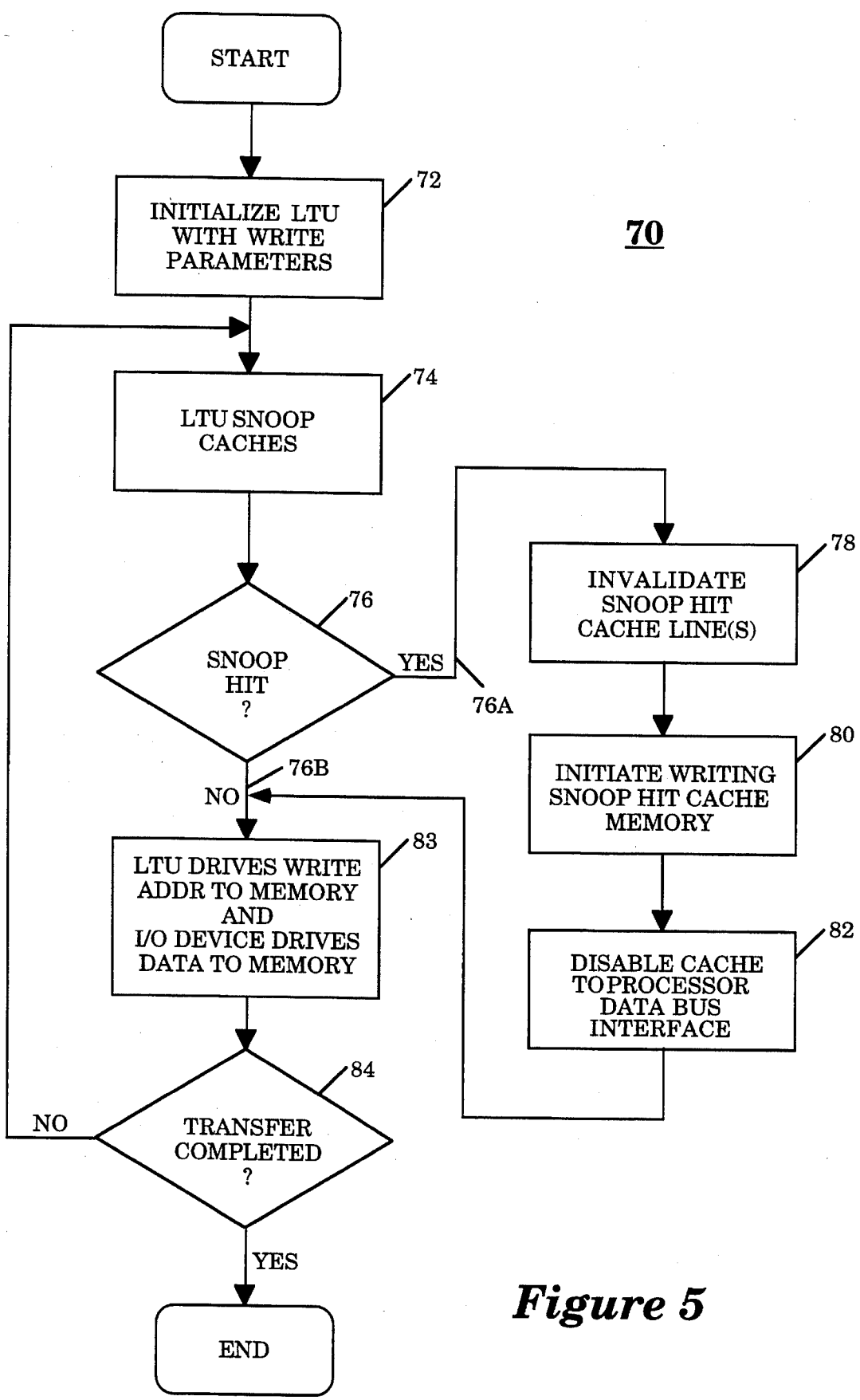
FIG. 5 shows a flow diagram for the method of the present invention for transferring cacheable I/O data from an I/O device to a memory.

Referring now to FIGS. 1–2 in conjunction with FIGS. 4–5, to transfer a number of lines of data from the shared memory 20 to the I/O device 32, the I/O device 32 initializes the next line address register 38 and the line counter 40 of the line transfer control unit 30' with the starting address of the first line to be transferred, and the number of lines to be transferred, block 52. Upon detecting that the next line address register 38 is non-empty, the control logic block 42 causes the stored address to be driven onto the processor address bus 22 to snoop the private caches, 16 and 18, block 54.

If the snooping results in snoop hit in one of the private caches, 16 and 18, branch 56a, the snoop hit cache, 16 or 18, drives the data in the snoop hit cache line into shared memory 20, block 58. Similar to a normal cache line transfer from a private cache, 16 or 18, to the shared memory 20, the snoop hit address and data are driven onto the processor address and data buses, 22 and 26, respectively. The current line address register 34 and the line data register 36 of the line transfer control unit 30' latch the snoop hit address and data, and drive them onto the memory address and data buses, 24 and 28, respectively. The shared memory 20 then latches the snoop hit address and data and stores the data into the address provided. In addition, upon detecting the presence of the snoop hit data on the processor data bus 26, the I/O device 32 latches the data from the processor data bus 26, block 63. Furthermore, as the data are driven from the processor data bus 26 into the line data register 36 of the line transfer control unit 30', the control logic block 42 causes the line count in the line counter 40 to be decremented.

If the snooping results in no snoop hit in any of the private caches, 16 and 18, branch 56b, the control logic block 42 causes the stored address in the next line address register 38 to be driven into the current line address register 34 of the line transfer control unit 30'. The current line address register 34 in turn drives the address onto the memory address bus 24. Upon receiving the address, in response, the shared memory 20 returns a line of data stored in the memory locations indicated by the received address, block 62. The shared memory 20 drives the returning data onto the memory data bus 28. The line data register 36 of the line transfer control unit 30' latches the returning data, and drives them onto the processor data bus 26. Similarly, upon detecting the presence of the returning data on the processor data bus 26, the I/O device 32 latches the data from the processor data bus 26, block 63. In addition, as the data are driven from the line data register 36 onto the processor data bus 26, the control logic block 42 causes the line count in the line counter 40 to be decremented.

The above described steps, blocks 52–63, are repeated if it is determined that additional lines of data are to be transferred from the shared memory 20 to the I/O device 32, block 64. Upon decrementing the line count in the line counter 40, the control logic block 42 determines whether additional lines of data are to be transferred from the shared memory 20 to the I/O device 32, by examining whether the line count in line counter 40 is zero. If the line count is non-zero, the control logic block 42 causes the stored address in the next line address register 38 to be incremented, and be driven onto the processor address bus 22 to snoop the private caches, 16 and 18, for the next line to be transferred. As described earlier, the stored address in the next line address register 38 is incremented and driven onto the processor address bus 22, as soon as either the snoop hit address driven onto the processor address bus 22 by the snoop hit cache, 16 or 18, or the pre-increment stored address in the next line address register 38 is latched into the current line address register 34.

Steps 54–63 are performed repeatedly until it is determined that the requested number of lines of data have been transferred from the shared memory 20 to the I/O device 32. The control logic block 42 determines that the requested number of lines of data have been transferred from the shared memory 20 to the I/O device 32, when the line count in the line counter 40 has been decremented to zero.

While the method of transfer data from the shared memory 20 to the I/O device 32 has been described with steps 54–62, it will be appreciated that these steps are necessary only if the private caches, 16 and 18, are write back caches. The present invention may be practiced without these steps if the private caches, 16–18, are write through caches with cache coherency maintained.

Similarly, to transfer a number of lines of data from the I/O device 32 to the shared memory, the I/O device 32 initializes the next line address register 38 and the line counter 40 of the line transfer control unit 30' with the starting address of the destination for the first line to be transferred, and the number of lines to be transferred, block 72. Upon detecting that the next line address register 38 is non-empty, the control logic block 42 causes the stored address to be driven onto the processor address bus 22 to snoop the private caches, 16 and 18, block 74.

If the snooping results in snoop hit in any of the private caches, 16 and 18, branch 76a, the snoop hit cache, 16 or 18, invalidates the snoop hit cache line, block 78. The snoop hit cache, 16 or 18, then initiates to drive the snoop hit address and data onto the processor address and data buses, 22 and 26, respectively, block 80. Concurrently, upon detecting that the snooping resulted in snoop hit, the control logic block 42 of the line transfer control unit 30' disables the cache to processor address and data bus interfaces, block 82.

Upon detecting that the next line address register 38 has been initialized, regardless whether the snooping results in a snoop hit, the control logic block 42 causes the stored address in the next line address register 38 to be driven into the current line address register 34, block 83. Concurrently, upon initializing the next line address register 38 and the line counter 40 of the line transfer control unit 30', regardless whether the snooping results in a snoop hit, the I/O device 32 starts driving the data to be transferred into the shared memory 20, one line at a time. The line data register 36 in turn latches the line data from the processor data bus 26, and drives them onto the memory data bus 28, one line at a time, block 83. Additionally, while the line data are being latched from the processor data bus 26 into the line data register 36, the control logic block 42 decrements the line count in line counter 40 for every line of data latched from the processor data bus 26 into the line data register 36.

The above described steps, blocks 74–83, are repeated if it is determined that additional lines of data are to be transferred from the I/O device 32 to the shared memory 20, block 84. Upon decrementing the line count in the line counter 40, the control logic block 42 determines whether additional lines of data are to be transferred from the I/O device 32 to the shared memory 20, by examining whether the line count in line counter 40 is zero. If the line count is non-zero, the control logic block 42 causes the stored address in the next line address register 38 to be incremented, and be driven onto the processor address bus 22 to snoop the private caches, 16 and 18, for the next line to be transferred. As described earlier, the stored address in the next line address register 38 is incremented and driven onto the processor address bus 22, as soon as the pre-increment stored address in the next line address register 38 is latched into the current line address register 34.

Steps 74–83 are performed repeatedly until it is determined that the requested number of cache lines of data have been transferred from the I/O device 32 to the shared memory 20. The control logic block 42 determines that the requested number of lines of data have been transferred from the I/O device 32 to the shared memory 20, when the line count in the line counter 40 has been decremented to zero.

While the method of transfer data from the I/O device 32, the shared memory 20, has been described with steps 74–82, it will be appreciated that steps 74–78 are necessary regardless whether the private caches are write back or write through caches. However, steps 80 and 82 are optional, they merely simplify the implementation of the present invention allowing existing cache line validation circuitry to be used.

While the present invention has been described in terms of presently preferred and alternate embodiments, those skilled in the art will recognize that the invention is not limited to the preferred and alternate embodiments described. The method and apparatus of the present invention can be practiced with modification and alteration within the spirit and scope of the appended claims. The description is thus to be regarded as illustrative instead of limiting on the present invention.

What is claimed is:

1. In a multiprocessor system having a first and a second processor, a first and a second corresponding private cache, a shared memory, and an input/output (I/O) device, wherein cache coherency is maintained on a basis of a predetermined size (S), and I/O data stored in said shared memory are cacheable in said private caches, an apparatus for transferring I/O data between said shared memory and said I/O device and maintaining cache coherency, said apparatus comprising:

a) address generation and control circuitry coupled to said I/O device for receiving from said I/O device a first read parameter denoting a starting memory location of a plurality of contiguous memory locations of said shared memory from which a plurality of read I/O data having a read I/O size (R) in integer multiple(s) of S are to be transferred to said I/O device in one or more transfers with each transfer transferring one cache coherency basis (CCB) of read I/O data, said address generation and control circuitry being also coupled to said private caches, and used for generating a plurality of read snoop addresses using said received first read parameter and S, outputting for said private caches said generated read snoop addresses to snoop said private caches, one read snoop address at a time, said address generation and control circuitry being also coupled to said shared memory, and concurrently used for conditionally generating a plurality of read source addresses using said output read snoop addresses whenever said output read snoop addresses do not result in read snoop hit, and outputting for said shared memory said conditionally generated read source addresses to access said shared memory, one read source address at a time with the read source addresses lagging behind the corresponding read snoop addresses in a predetermined manner;

b) a buffer coupled to said shared memory and said I/O device for receiving from said share memory non-cached ones of said read I/O data, storing said received non-cached ones of said read I/O data, and outputting for said I/O device said stored non-cached ones of said read I/O data, one CCB of non-cached read I/O data at a time and synchronized to said generating and outputting of read source addresses.

2. The apparatus as set forth in claim 1, wherein said address generation and control circuitry comprises:

(a.1) a first register coupled to said I/O device and said private caches for receiving from said I/O device said first read parameter, storing said received first read parameter, and outputting for said private caches said stored first read parameter as the first of said read snoop addresses, said first register being also used for consecutively receiving remaining ones of said generated read snoop addresses, consecutively storing said consecutively received remaining ones of said generated read snoop addresses, and consecutively outputting said consecutively stored remaining ones of said generated read snoop addresses, one read snoop address at a time; and (a.2) control circuitry coupled to said first register for controlling input to and output from said first register, said control circuitry being also used for consecutively generating for said first register said remaining ones of said read snoop addresses by consecutively receiving from said first register said output read snoop addresses, consecutively modifying said consecutively received read snoop addresses by one S, and consecutively outputting for said first register said consecutively modified read snoop addresses, one read snoop address at a time.

3. The apparatus as set forth in claim 2, wherein, said address generation and control circuitry further comprises (a.3) a second register coupled to said first register and said shared memory for conditionally receiving from said first register said consecutively output read snoop addresses whenever said output read snoop addresses do not result in read snoop hit, storing said conditionally received read snoop addresses, and outputting for said shared memory said stored snoop read addresses as said read source addresses, one read source address at a time with the read source address of the current CCB of said read I/O data synchronized to the read snoop address of the next CCB of said read I/O data;

said control circuitry is further coupled to said second register and said buffer, and used for controlling input to and output from said second register and said buffer in a synchronized manner.

4. The apparatus as set forth in claim 1, wherein said address generation and control circuitry is further used for receiving from said I/O device a second read parameter denoting R, tracking the amount of read I/O data remains to be transferred from to said I/O device using R and S, and terminating said generating and outputting of read snoop and source addresses after all CCB of read I/O data had been snooped and transferred to said I/O device respectively.

5. The apparatus as set forth in claim 4, wherein said address generation and control circuitry comprises:

(a.1) a first register coupled to said I/O device for receiving from said I/O device said second read parameter, storing said received second read parameter, and outputting said stored second read parameter as a first of a plurality of remainder values denoting the remaining amount of read I/O data still to be transferred to said I/O device, said first register being also used for consecutively receiving successive ones of said remainder values, consecutively storing said consecutively received remainder values, and consecutively outputting said consecutively stored remainder values, one remainder value at a time; and (a.2) control circuitry coupled to said first register for controlling input to and output from said first register, said control circuitry being also used for consecutively generating for said first register said successive ones of said remainder values by consecutively receiving from said first register said output remainder values, consecutively modifying said consecutively received remainder values by one S, and consecutively outputting for said first register said consecutively modified remainder values, one remainder value at a time.

6. The apparatus as set forth in claim 1, wherein, said private caches output read snoop hit addresses and read snoop hit data whenever said output read snoop addresses result in read snoop hits;

said address generation and control circuitry is also concurrently used for conditionally generating a plurality of write destination addresses using said read snoop hit addresses whenever said output read snoop addresses result in read snoop hits, and outputting for said shared memory said conditionally generated write destination addresses to access said shared memory, one write destination address at a time with the write destination addresses lagging behind the corresponding read snoop addresses in a predetermined manner;

said buffer is also used for conditionally receiving from said private caches read snoop hit data whenever said output read snoop addresses result in read snoop hits, storing said received read snoop hit data, and outputting for said shared memory said stored read snoop hit data, one CCB of read snoop hit data at a time and synchronized to said generating and outputting of write destination addresses.

7. The apparatus as set forth in claim 6, wherein, said address generation and control circuitry comprises:

(a.1) a first register coupled to said I/O device and said private caches for receiving from said I/O device said first read parameter, storing said received first read parameter, and outputting for said private caches said stored first read parameter as the first of said read snoop addresses, said first register being also used for consecutively receiving remaining ones of said generated read snoop addresses, consecutively storing said consecutively received remaining ones of said generated read snoop addresses, and consecutively outputting said consecutively stored remaining ones of said generated read snoop addresses, one read snoop address at a time, (a.2) a second register coupled to said first register, said private caches and said shared memory for conditionally receiving either from said first register said consecutively output read snoop addresses whenever said output read snoop addresses do not result in read snoop hit or from said private caches said read snoop hit addresses whenever said output read snoop addresses result in read snoop hits, storing said conditionally received read snoop/read snoop hit addresses, and outputting for said shared memory either said stored snoop read addresses as said read source addresses or said stored read snoop hit addresses as write destination addresses, one read source/write destination address at a time with the read source/write destination address of the current CCB of said read I/O data synchronized to the read snoop address of the next CCB of said read I/O data; and (a.3) control circuitry coupled to said first register for controlling input to and output from said first register, said control circuitry being also used for consecutively generating for said first register said remaining ones of said read snoop addresses by consecutively receiving from said first register said output read snoop addresses, consecutively modifying said consecutively received read snoop addresses by one S, and consecutively outputting for said first register said consecutively modified read snoop addresses, one read snoop address at a time, said control circuitry is further coupled to said second register and said buffer, and used for controlling input to and output from said second register and said buffer in a synchronized manner.

8. In a multiprocessor system having a first and a second processor, a first and a second corresponding private cache, a shared memory, and an input/output (I/O) device, wherein cache coherency is maintained on a basis of a predetermined size (S), and I/O data stored in said shared memory are cacheable in said private caches, an apparatus for transferring I/O data between said shared memory and said I/O device and maintaining cache coherency, said apparatus comprising:

a) address generation and control circuitry coupled to said I/O device for receiving from said I/O device a first write parameter denoting a starting memory location of a plurality of contiguous memory locations of said shared memory against which a plurality of write I/O data having a write I/O size (W) in integer multiple(s) of S from said I/O device are to be transferred to, in one or more transfers with each transfer transferring one cache coherency basis (CCB) of write I/O data, said address generation and control circuitry being also coupled to said shared memory and said private caches, and used for generating a plurality of write snoop addresses using said received first write parameter and S, outputting for said private caches said generated write snoop addresses to snoop said private caches, one write snoop address at a time, said address generation and control circuitry being also used for generating a plurality of write destination addresses using said output write snoop addresses, and outputting for said shared memory said generated write destination addresses to access said shared memory, one write snoop and destination address pair at a time with the write destination address lagging behind the corresponding write snoop address in a predetermined manner;

b) a buffer coupled to said I/O device, said shared memory and said address generation and control circuitry for receiving from said I/O device said write I/O data, storing said received write I/O data, and outputting for said shared memory said stored write I/O data, one CCB of said write I/O data at a time and synchronous to said generating and outputting of write destination addresses.

9. The apparatus as set forth in claim 8, wherein said address generation and control circuitry comprises:

(a.1) a first register coupled to said I/O device and said private caches for receiving from said I/O device said first write parameter, storing said received first write parameter, and outputting for said private caches said stored first write parameter as the first of said write snoop addresses, said first register being also used for consecutively receiving remaining ones of said generated write snoop addresses, consecutively storing said consecutively received remaining ones of said generated write snoop addresses, and consecutively outputting said consecutively stored remaining ones of said generated write snoop addresses, one write snoop address at a time; and (a.2) control circuitry coupled to said first register for controlling input to and output from said first register, said control circuitry being also used for consecutively generating for said first register said remaining ones of said write snoop addresses by consecutively receiving from said first register said output write snoop addresses, consecutively modifying said consecutively received write snoop addresses by one S, and consecutively outputting for said first register said consecutively modified write snoop addresses, one write snoop address at a time.

10. The apparatus as set forth in claim 9, wherein, said address generation and control circuitry further comprises (a.3) a second register coupled to said first register and said shared memory for consecutively receiving from said first register said consecutively output write snoop addresses, consecutively storing said consecutively received write snoop addresses, and consecutively outputting for said shared memory said consecutively stored snoop write addresses as said write destination addresses, one write destination address at a time with the write destination address of the current CCB of said write I/O data synchronized to the write snoop address of the next CCB of said write I/O data;

said control circuitry being also coupled to said second register and said buffer for controlling input to and output from said second register and said buffer in a synchronized manner.

11. The apparatus as set forth in claim 8, wherein said address generation and control circuitry is further used for receiving from said I/O device a second read parameter denoting W, tracking the amount of write I/O data remains to be transferred from to said I/O device using W and S, and terminating said generating and outputting of write snoop and destination addresses after all CCB of write I/O data had been snooped and transferred from said I/O device respectively.

12. The apparatus as set forth in claim 11, wherein said address generation and control circuitry further comprises:

(a.1) a first register coupled to said I/O device for receiving from said I/O device said second write parameter, storing said received second write parameter, and outputting said stored second write parameter as a first of a plurality of remainder values denoting the remaining amount of write I/O data still to be transferred to said share memory, said first register being also used for consecutively receiving successive ones of said remainder values, consecutively storing said consecutively received remainder values, and consecutively outputting said consecutively stored remainder values, one remainder value at a time; and (a.2) control circuitry coupled to said first register for controlling input to and output from said first register, said control circuitry being also used for consecutively generating for said first register said successive ones of said remainder values by consecutively receiving from said first register said output remainder values, consecutively modifying said consecutively received remainder values by one S, and consecutively outputting for said first register said consecutively modified remainder values, one remainder value at a time.

13. The apparatus as set forth in claim 8, wherein, said private caches output write snoop hit addresses and write snoop hit data whenever said output write snoop addresses result in write snoop hits;

said address generation and control circuitry is also used for preventing said write snoop hit data from being written into said shared memory.

14. In a multiprocessor system having a first and a second processor, a first and a second corresponding private cache, a shared memory, and an input/output (I/O) device, wherein cache coherency is maintained on a basis of a predetermined size (S), and I/O data stored in said shared memory are cacheable in said private caches, a method for transferring I/O data between said shared memory and said I/O device and maintaining cache coherency, said method comprising the steps of:

a) receiving from said I/O device a first read parameter denoting a starting memory location of a plurality of contiguous memory locations of said shared memory from which a plurality of read I/O data having a read I/O size (R) in integer multiple(s) of S are to be transferred to said I/O device in one or more transfers with each transfer transferring one cache coherency basis (CCB) of read I/O data;

b) generating a plurality of read snoop addresses using said received first read parameter and S, outputting for said private caches said generated read snoop addresses to snoop said private caches, one read snoop address at a time;

c) concurrently but conditionally generating a plurality of read source addresses using said output read snoop addresses whenever said output read snoop addresses do not result in read snoop hit, and outputting for said shared memory said conditionally generated read source addresses to access said shared memory, one read source address at a time with the read source addresses lagging behind the corresponding read snoop addresses in a predetermined manner; and d) receiving from said share memory non-cached ones of said read I/O data, storing said received non-cached ones of said read I/O data, and outputting for said I/O device said stored non-cached ones of said read I/O data, one CCB of non-cached read I/O data at a time and synchronized to said generating and outputting of read source addresses.

15. The method as set forth in claim 14, wherein step (b) comprises the steps of:

(b.1) storing said received first read parameter, and outputting for said private caches said stored first read parameter as the first of said read snoop addresses, (b.2) consecutively receiving remaining ones of said generated read snoop addresses, consecutively storing said consecutively received remaining ones of said generated read snoop addresses, and consecutively outputting said consecutively stored remaining ones of said generated read snoop addresses, one read snoop address at a time, (b.3) consecutively generating said remaining ones of said read snoop addresses by consecutively receiving said output read snoop addresses, consecutively modifying said consecutively received read snoop addresses by one S, and consecutively outputting said consecutively modified read snoop addresses, one read snoop address at a time.

16. The method as set forth in claim 15, wherein, step (c) comprises conditionally receiving said consecutively output read snoop addresses whenever said output read snoop addresses do not result in read snoop hit, storing said conditionally received read snoop addresses, and outputting for said shared memory said stored snoop read addresses as said read source addresses, one read source address at a time with the read source address of the current CCB of said read I/O data synchronized to the read snoop address of the next CCB of said read I/O data.

17. The method as set forth in claim 14, wherein said method further comprises the step of:

(e) receiving from said I/O device a second read parameter denoting R, tracking the amount of read I/O data remains to be transferred from to said I/O device using R and S, and terminating said generating and outputting of read snoop and source addresses after all CCB of read I/O data had been snooped and transferred to said I/O device respectively.

18. The method as set forth in claim 17, wherein step (e) comprises the steps of:

(e.1) storing said received second read parameter, and outputting said stored second read parameter as a first of a plurality of remainder values denoting the remaining amount of read I/O data still to be transferred to said I/O device, (e.2) consecutively receiving successive ones of said remainder values, consecutively storing said consecutively received remainder values, and consecutively outputting said consecutively stored remainder values, one remainder value at a time, and (e.3) consecutively generating said successive ones of said remainder values by consecutively receiving said output remainder values, consecutively modifying said consecutively received remainder values by one S, and consecutively outputting for said consecutively modified remainder values, one remainder value at a time.

19. The method as set forth in claim 14, wherein, step (b) further comprises outputting read snoop hit addresses and read snoop hit data by said private caches whenever said output read snoop addresses result in read snoop hits;

step (c) further comprises concurrently but conditionally generating a plurality of write destination addresses using said read snoop hit addresses whenever said output read snoop addresses result in read snoop hits, and outputting for said shared memory said conditionally generated write destination addresses to access said shared memory, one write destination address at a time with the write destination addresses lagging behind the corresponding read snoop addresses in a predetermined manner; and step (d) further comprises conditionally receiving from said private caches read snoop hit data whenever said output read snoop addresses result in read snoop hits, storing said received read snoop hit data, and outputting for said shared memory said stored read snoop hit data, one CCB of read snoop hit data at a time and synchronized to said generating and outputting of write destination addresses.

20. The method as set forth in claim 19, wherein, step (b) comprises the steps of:

(b.1) storing said received first read parameter, and outputting for said private caches said stored first read parameter as the first of said read snoop addresses, (b.2) consecutively receiving remaining ones of said generated read snoop addresses, consecutively storing said consecutively received remaining ones of said generated read snoop addresses, and consecutively outputting said consecutively stored remaining ones of said generated read snoop addresses, one read snoop address at a time, (b.3) consecutively generating said remaining ones of said read snoop addresses by consecutively receiving said output read snoop addresses, consecutively modifying said consecutively received read snoop addresses by one S, and consecutively outputting said consecutively modified read snoop addresses, one read snoop address at a time, step (c) comprises conditionally receiving either said consecutively output read snoop addresses whenever said output read snoop addresses do not result in read snoop hit or said read snoop hit addresses whenever said output read snoop addresses result in read snoop hits, storing said conditionally received read snoop/ read snoop hit addresses, and outputting for said shared memory either said stored snoop read addresses as said read source addresses or said stored read snoop hit addresses as write destination addresses, one read source/write destination address at a time with the read source/write destination address of the current CCB of said read I/O data synchronized to the read snoop address of the next CCB of said read I/O data.

21. In a multiprocessor system having a first and a second processor, a first and a second corresponding private cache, a shared memory, and an input/output (I/O) device, wherein cache coherency is maintained on a basis of a predetermined size (S), and I/O data stored in said shared memory are cacheable in said private caches, a method for transferring I/O data between said shared memory and said I/O device and maintaining cache coherency, said method comprising the steps of:

a) receiving from said I/O device a first write parameter denoting a starting memory location of a plurality of contiguous memory locations of said shared memory against which a plurality of write I/O data having a write I/O size (W) in integer multiple(s) of S from said I/O device are to be transferred to, in one or more transfers with each transfer transferring one cache coherency basis (CCB) of write I/O data;

(b) generating a plurality of write snoop addresses using said received first write parameter and S, outputting for said private caches said generated write snoop addresses to snoop said private caches, one write snoop address at a time;

(c) generating a plurality of write destination addresses using said output write snoop addresses, and outputting for said shared memory said generated write destination addresses to access said shared memory, one write snoop and destination address pair at a time with the write destination address lagging behind the corresponding write snoop address in a predetermined manner; and (d) receiving from said I/O device said write I/O data, storing said received write I/O data, and outputting for said shared memory said stored write I/O data, one CCB of said write I/O data at a time and synchronous to said generating and outputting of write destination addresses.

22. The method as set forth in claim 21, wherein, step (b) comprises the steps of:

(b.1) receiving from said I/O device said first write parameter, storing said received first write parameter, and outputting for said private caches said stored first write parameter as the first of said write snoop addresses, (b.2) consecutively receiving remaining ones of said generated write snoop addresses, consecutively storing said consecutively received remaining ones of said generated write snoop addresses, and consecutively outputting said consecutively stored remaining ones of said generated write snoop addresses, one write snoop address at a time, (b.3) consecutively generating said remaining ones of said write snoop addresses by consecutively receiving said output: write snoop addresses, consecutively modifying said consecutively received write snoop addresses by one S, and consecutively outputting for said first register said consecutively modified write snoop addresses, one write snoop address at a time.

23. The method as set forth in claim 22, wherein, step (c) comprises consecutively receiving said consecutively output write snoop addresses, consecutively storing said consecutively received write snoop addresses, and consecutively outputting for said shared memory said consecutively stored snoop write addresses as said write destination addresses, one write destination address at a time with the write destination address of the current CCB of said write I/O data synchronized to the write snoop address of the next CCB of said write I/O data.

24. The method as set forth in claim 21, wherein said method further comprises the step of (e) receiving from said I/O device a second read parameter denoting W, tracking the amount of write I/O data remains to be transferred from to said I/O device using W and S, and terminating said generating and outputting of write snoop and destination addresses after all CCB of write I/O data had been snooped and transferred from said I/O device respectively.

25. The method as set forth in claim 24, wherein said step (e) comprises the steps of:

(e.1) storing said received second write parameter, and outputting said stored second write parameter as a first of a plurality of remainder values denoting the remaining amount of write I/O data still to be transferred to said share memory;

(e.2) consecutively receiving successive ones of said remainder values, consecutively storing said consecutively received remainder values, and consecutively outputting said consecutively stored remainder values, one remainder value at a time; and (e.3) consecutively generating said successive ones of said remainder values by consecutively receiving from said first register said output remainder values, consecutively modifying said consecutively received remainder values by one S, and consecutively outputting for said first register said consecutively modified remainder values, one remainder value at a time.

26. The method as set forth in claim 21, wherein, step (b) further comprises outputting write snoop hit addresses and write snoop hit data by said private caches whenever said output write snoop addresses result in write snoop hits; and step (c) further comprises preventing said write snoop hit data from being written into said shared memory.

* * * * *

UNITED STATES PATENT AND TRADEMARK OFFICE
CERTIFICATE OF CORRECTION

PATENT NO. : 5,511,226
DATED : April 23, 1996
INVENTOR(S) : Anthony M. Zilka It is certified that error appears in the above-identified patent and that said Letters Patent is hereby corrected as shown below:

In column 6 at line 49 delete "file" and insert --the--

Signed and Sealed this

Thirtieth Day of July, 1996

Attest:

BRUCE LEHMAN

*Attesting Officer*     *Commissioner of Patents and Trademarks*